(12) United States Patent
Hayashi et al.

(10) Patent No.: US 10,882,485 B2
(45) Date of Patent: Jan. 5, 2021

(54) PASSENGER PROTECTION DEVICE HAVING FRONT AIRBAG AND WINDOW AIRBAG

(71) Applicant: TOYODA GOSEI CO., LTD., Kiyosu (JP)

(72) Inventors: Shinji Hayashi, Kiyosu (JP); Takashi Iida, Kiyosu (JP); Yuka Umemoto, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 115 days.

(21) Appl. No.: 16/223,665

(22) Filed: Dec. 18, 2018

(65) Prior Publication Data

US 2019/0193668 A1 Jun. 27, 2019

(30) Foreign Application Priority Data

Dec. 25, 2017 (JP) ................................. 2017-248389

(51) Int. Cl.
*B60R 21/233* (2006.01)
*B60R 21/203* (2006.01)
*B60R 21/21* (2011.01)
*B60R 21/231* (2011.01)
*B60R 21/2338* (2011.01)
(Continued)

(52) U.S. Cl.
CPC .......... *B60R 21/233* (2013.01); *B60R 21/203* (2013.01); *B60R 21/21* (2013.01); *B60R 21/231* (2013.01); *B60R 21/2338* (2013.01); *B60R 21/23138* (2013.01); *B60R 2021/0009* (2013.01); *B60R 2021/0023* (2013.01); *B60R 2021/01231* (2013.01);
(Continued)

(58) Field of Classification Search
CPC .. B60R 2021/01231; B60R 2021/0009; B60R 2021/23107; B60R 21/23138; B60R 21/233; B60R 21/203; B60R 21/205
See application file for complete search history.

(56) References Cited

U.S. PATENT DOCUMENTS 6,390,498 B1 * 5/2002 Francis ................. B60R 21/013
180/282
9,522,648 B2 * 12/2016 Fukawatase .......... B60R 21/233
(Continued)

FOREIGN PATENT DOCUMENTS

JP 2009-96297 A 5/2009
WO 2013/099036 A1 7/2013

*Primary Examiner* — James A English
(74) *Attorney, Agent, or Firm* — Posz Law Group, PLC (57) ABSTRACT

A passenger protection device includes: a front airbag configured to inflate so as to cover a front of the passenger; a front inflator configured to supply the inflation gas to the front airbag; a window airbag accommodated with being folded at an upper edge-side of a window arranged at a lateral side of the passenger and configured to inflate so as to cover a vehicle interior-side of the window; and a window airbag inflator configured to supply the inflation gas to the window airbag. The window airbag includes a bag-adjacent inflation part configured to cover a side of a head of the passenger received by the front airbag, and an activation start timing of the window airbag inflator is set within a range of −20 ms to −5 ms from a time at which the front airbag having completely inflated starts to receive the passenger.

3 Claims, 8 Drawing Sheets

(51) Int. Cl.
*B60R 21/00* (2006.01)
*B60R 21/01* (2006.01)

(52) U.S. Cl.
CPC ............... *B60R 2021/23107* (2013.01); *B60R 2021/23308* (2013.01); *B60R 2021/23386* (2013.01)

(56) References Cited

U.S. PATENT DOCUMENTS

| | | | |
|---|---|---|---|
| 9,527,469 B2 * | 12/2016 | Fukawatase | B60R 21/231 |
| 2007/0228704 A1 * | 10/2007 | Cuddihy | B60R 21/0132 |
| | | | 280/735 |
| 2009/0099749 A1 | 4/2009 | Hayasaka et al. | |
| 2014/0361521 A1 * | 12/2014 | Fukawatase | B60R 21/01552 |
| | | | 280/730.1 |
| 2018/0065581 A1 * | 3/2018 | Ohno | B60R 21/01 |
| 2018/0215335 A1 * | 8/2018 | Ghannam | B60R 21/013 |

* cited by examiner

PASSENGER PROTECTION DEVICE HAVING FRONT AIRBAG AND WINDOW AIRBAG

CROSS-REFERENCE TO RELATED APPLICATION(S)

This application is based upon and claims the benefit of priority from prior Japanese patent application No. 2017-248389, filed on Dec. 25, 2017, the entire contents of which are incorporated herein by reference.

TECHNICAL FIELD

The present invention relates to a passenger protection device capable of protecting a passenger sitting on a front seat and moving obliquely forward and toward a vehicle exterior-side upon an oblique collision or offset collision of a vehicle.

BACKGROUND ART

In the related art, a passenger protection device is available which includes an airbag for front passenger seat arranged in front of a front passenger seat and configured to protect a passenger sitting on the front passenger seat upon completion of inflation thereof and an airbag for window configured to inflate so as to cover a side window of the front passenger seat upon completion of inflation thereof and is configured to activate an inflator for window configured to supply an inflation gas to the airbag for window after predetermined time elapses from activation of an inflator for front passenger seat configured to supply an inflation gas to the airbag for front passenger (for example, refer to Patent Document 1).

Patent Document 1: WO2013/99036

Specifically, in the passenger protection device of the related art, the inflator for window configured to supply the inflation gas to the airbag for window is activated after 50 to 150 ms from the activation of the inflator for front passenger seat configured to supply the inflation gas to the airbag for front passenger, upon a small overlap collision of a vehicle. In the passenger protection device of the related art, upon the small overlap collision of the vehicle, a passenger moving obliquely forward is first restrained by the airbag for front passenger seat having completely inflated, and a head of the passenger rebounding obliquely rearward and toward a window is then received by the airbag for window configured to inflate later than the airbag for front passenger seat.

That is, in the passenger protection device of the related art, when the passenger moves obliquely forward, the airbag for window has not inflated yet, so that the head of the passenger moving obliquely forward is not restrained by both the airbag for front passenger seat and the airbag for window:

The present invention has been made in view of the above situations, and an object thereof is to provide a passenger protection device capable of correctly protecting a passenger moving obliquely forward by both a front airbag configured to inflate in front of the passenger and an airbag for window configured to inflate so as to cover a vehicle interior-side of a window at a lateral side of the passenger.

SUMMARY OF INVENTION

According to an aspect of the invention, there is provided a passenger protection device capable of protecting a passenger sitting on a front seat and moving obliquely forward and toward a vehicle exterior-side upon an oblique collision or offset collision of a vehicle. The passenger protection device includes a front airbag accommodated with being folded in front of the front seat and configured to inflate so as to cover a front of an upper half body of the passenger sitting on the front seat by allowing an inflation gas to flow therein upon activation; a front inflator configured to supply the inflation gas to the front airbag upon activation; a window airbag (sometimes referred to as an "airbag for window") accommodated with being folded at an upper edge-side of a window of the vehicle arranged at a lateral side of the passenger and configured to inflate so as to cover a vehicle interior-side of the window by allowing an inflation gas to flow therein upon activation; and a window airbag inflator (sometimes referred to as an "inflator for window" configured to supply the inflation gas to the window airbag upon activation. The window airbag includes a bag-adjacent inflation part configured to cover a side of a head of the passenger received by the front airbag upon deployment, and an activation start timing of the window airbag inflator is set within a range of −20 ms to −5 ms from a time at which the front airbag having completely inflated starts to receive the passenger.

DESCRIPTION OF EMBODIMENTS

Hereinafter, an illustrative embodiment of the present invention will be described with reference to the drawings. Meanwhile, in the illustrative embodiment, the front and rear/upper and lower/left and right directions coincide with the front and rear/upper and lower/left and right directions of a vehicle V, unless particularly mentioned.

Figure 1:
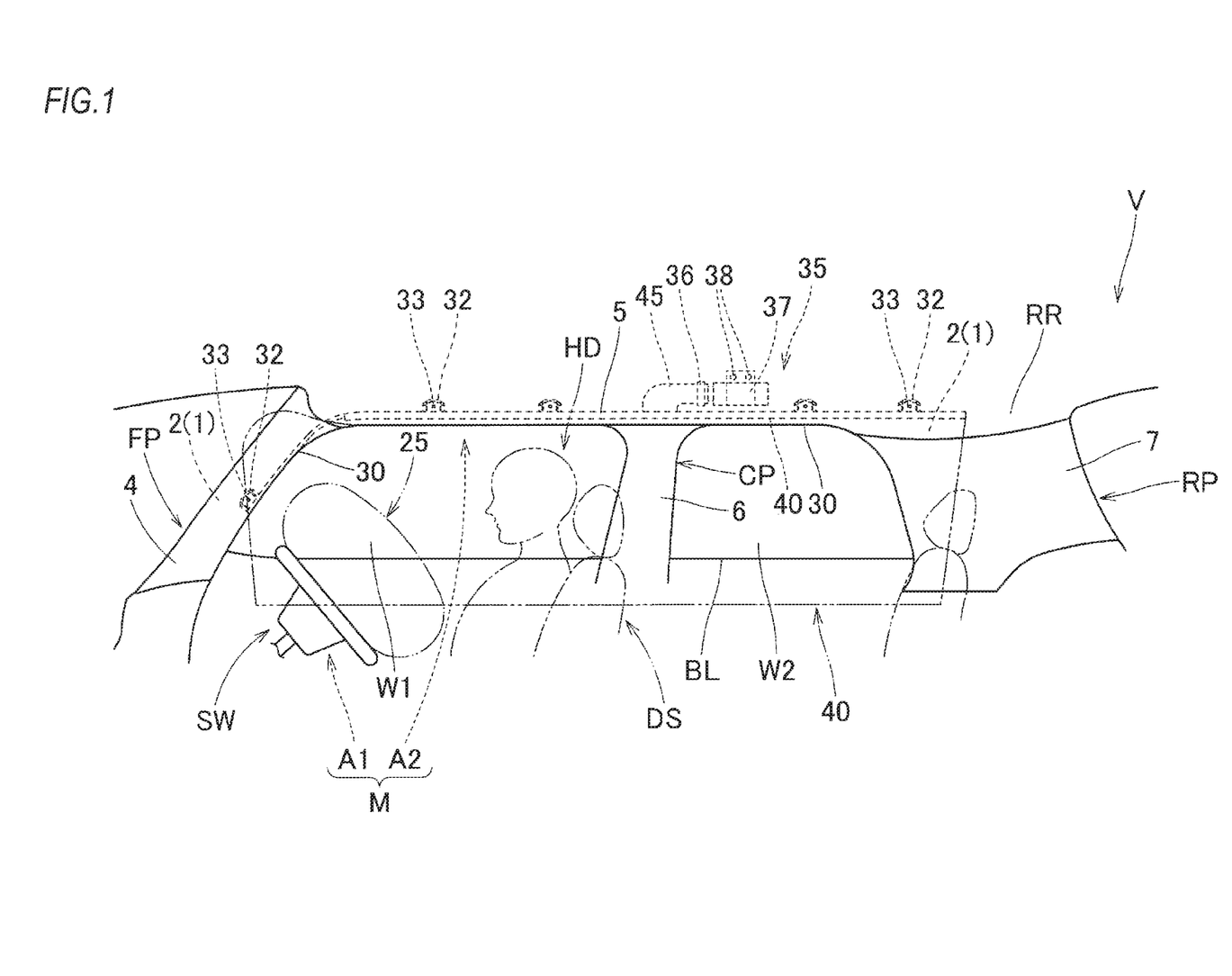
FIG. 1 is a schematic front view of a passenger protection device in accordance with an illustrative embodiment of the present invention, as seen from a vehicle interior-side.

A passenger protection device M of an illustrative embodiment is mounted to a two-row seat type vehicle V having a front seat and a rear seat, and is to protect a driver (passenger) MD sitting on a driver seat DS as the front seat. As shown in FIG. 1, the passenger protection device M includes a front airbag device A1 arranged in front of the driver seat DS and an airbag device A2 for window arranged at a vehicle exterior-side O (a vehicle exterior-side in a vehicle width direction) of the driver seat DS in the vehicle V.

Figure 2:
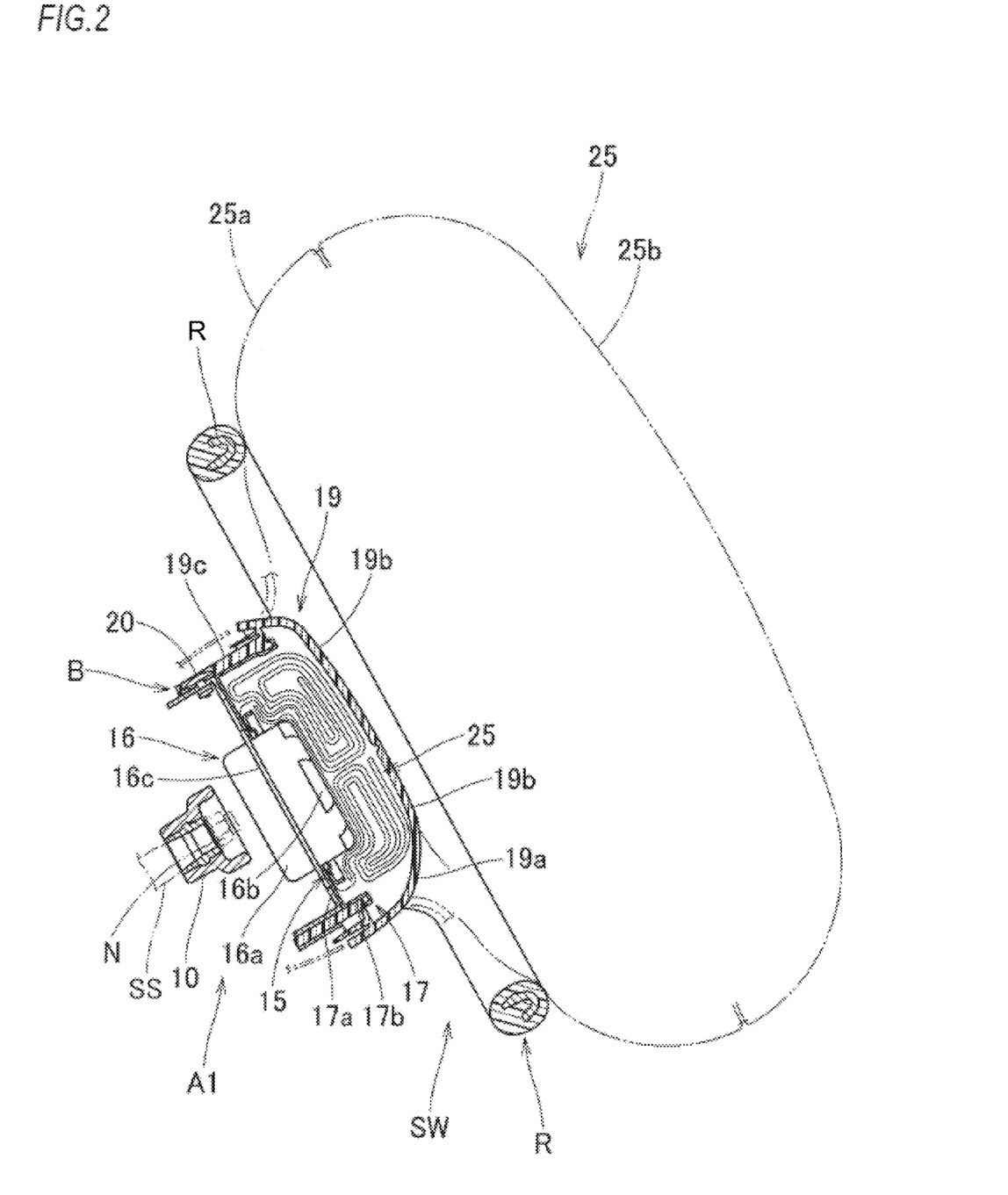
FIG. 2 is a schematic longitudinal sectional view depicting a front airbag device configuring the passenger protection device of the illustrative embodiment.

As shown in FIGS. 1 and 2, in the illustrative embodiment, the front airbag device A1 is mounted to a steering wheel SW ahead of the driver seat DS. The front airbag device A1 is configured by an airbag device for steering wheel for protecting the passenger (driver) MD sitting on the driver seat DS when inflating a front airbag 25 upon a front collision of the vehicle V. As shown in FIG. 2, the front airbag device A1 is arranged at a substantially central boss part B of the steering wheel SW, and includes a front airbag 25 accommodated with being folded, a front inflator 16 configured to supply an inflation gas to the front airbag 25, a case 17 configured to accommodate and hold therein the front airbag 25 and the front inflator 16, an airbag cover 19 for covering the folded front airbag 25, and a retainer 15 for mounting the front airbag 25 and the front inflator 16 to the case 17.

As shown in FIG. 2, the front inflator 16 has a substantially cylinder-shaped main body part 16a having a plurality of gas discharge ports 16b and a flange part 16c for mounting the front inflator 16 to the case 17. The flange part 16c is formed with through-holes (not shown) through which bolts (not shown) of the retainer 15 are respectively to pass. The front inflator 16 is electrically connected to a control device (not shown) and is configured to activate upon detection of a front collision, an oblique collision and an offset collision of the vehicle V by the control device. In the illustrative embodiment, the front inflator 16 is controlled by the control device so that it starts activation after 5 ms elapses from the collision detection of the vehicle V (from transmission of an ignition signal of a collision detection sensor).

As shown in FIG. 2, the case 17 is made of a plate material, and has a substantially rectangular plate-shaped bottom wall part 17a to which the front inflator 16 is inserted and mounted from below, and a peripheral wall part 12b extending vertically from an outer peripheral edge of the bottom wall part 17a. An upper end of the peripheral wall part 17b is arranged with a mounting piece (not shown) extending outward (refer to FIG. 1), and a mounting substrate of a horn switch mechanism (not shown) is mounted to the mounting piece. By using the mounting substrate (not shown), the case 17 is mounted and fixed to a metal insert 3 of the steering wheel SW, so that the front airbag device A1 is mounted to an upper part of the boss part B of the steering wheel SW. Also, a sidewall part 19c of the airbag cover 19 is mounted to the peripheral wall part 17b of the case 17 by using a rivet 20 or the like (refer to FIG. 2). In the illustrative embodiment, the bolts (mounting means) (not shown) of the retainer 15 arranged in the front airbag 25 are inserted through a peripheral edge of an inlet opening (a reference numeral thereof is omitted) of the front airbag 25, the bottom wall part 17a of the case 17 and the flange part 16c of the front inflator 16 and are then fixed with nuts (not shown), so that the front airbag 25 and the front inflator 16 are mounted to the bottom wall part 17a of the case 17.

The airbag cover 19 is made of a synthetic resin and has a ceiling wall part 19a configured to cover the upper of the front airbag 25 accommodated in the case 17 and a substantially rectangular tube-shaped sidewall part 19c extending downward from a vicinity of an outer peripheral edge of the ceiling wall part 19a. The ceiling wall part 19a is formed with two door parts 19b. 19b configured to be pushed and opened in a front and rear direction by the front airbag 25 being inflated.

In the illustrative embodiment, the front airbag 25 has a flexible bag shape formed of a flexible woven fabric formed by weaving polyester yarn or polyamide yarn, which is a non-coat fabric of which an outer surface is not applied with a coating agent. Specifically, the front airbag 25 is formed by joining a passenger-side wall part 25b, which has a circular outer shape and is to be arranged at the driver MD (passenger)-side upon completion of the inflation, and a vehicle body-side wall part 25a, which has a circular outer shape and is to be arranged at the steering wheel SW-side upon completion of the inflation, at outer peripheral edges thereof, is configured so that an outer shape thereof upon completion of the inflation is circular, as seen from above, and is substantially oval spherical close to a sphere, as seen from a side, as shown with the dashed-two dotted line in FIG. 2 and FIGS. 5 to 8, and is also configured to cover a rear surface (an upper surface along an axial direction of a steering shaft to which the steering wheel SW is mounted) of a ring part R of the steering wheel SW over a substantially entire surface. The front airbag 25 is configured to receive an upper half body of the driver MD moving forward or obliquely forward by the passenger-side wall part 25b, upon completion of the inflation.

The front airbag 25 is configured to inflate by activating the front inflator 16 after about 5 ms elapses from the collision detection of the vehicle V (from transmission of an ignition signal of a collision detection sensor) and allowing the inflation gas to flow into the front airbag. Also, in the front airbag device A1 of the illustrative embodiment, an airbag having a volume of about 50 to 60 L is used as the front airbag 25.

As shown in FIG. 1, the airbag device A2 for window is arranged at a vehicle interior-side of upper edges of windows W1, W2 arranged at a side (a vehicle exterior-side in the vehicle width direction) of the driver seat DS. The airbag device A2 for window is configured by an airbag device for head protection for protecting a head H of the driver MD, which is a passenger sitting on the driver seat DS, and a head of a passenger sitting on a seat at the rear of the driver seat DS when inflating the airbag 40 for window upon the side collision of the vehicle V.

As shown in FIG. 1, the airbag device A2 for window includes an airbag 40 for window, an inflator 35 for window, mounting brackets 32, 37, and an airbag cover 30. As shown in FIG. 1, the airbag 40 for window is accommodated with being folded from a lower edge-side of a front pillar part FP to an upper region of a rear pillar part RP via a lower edge-side of a roof side rail part RR at the upper edges of the windows W1, W2 of the vehicle interior-side of the vehicle V, and is configured to deploy and inflate downward from the upper edges of the windows W1, W2 so as to cover the vehicle interior-side of the windows W1, W2 upon inflow of the inflation gas.

As shown in FIGS. 1 and 5 to 8, the airbag cover 30 is configured by lower edges of a front pillar garnish 4 arranged at the front pillar part FP and a roof head lining 5 arranged at the roof side rail part RR. The front pillar garnish 4 and the roof head lining 5 are respectively made of a synthetic resin, and are respectively mounted to a vehicle interior-side of an inner panel 2 of a body (vehicle body) 1. The airbag cover 30 is configured to cover the vehicle interior-side of the airbag 40 for window accommodated with being folded and to be pushed and opened toward the vehicle interior-side by the airbag 40 for window so as to allow the airbag 40 for window to protrude downward at the vehicle interior-side upon deployment and inflation.

The inflator 35 for window is to supply the inflation gas to the airbag 40 for window, is a substantially circular cylinder type, as shown in FIG. 1, and has a gas discharge port (not shown) arranged at a leading end-side and capable of discharging the inflation gas. The inflator 35 for window is coupled to the airbag 40 for window by inserting the leading end-side including a vicinity of the gas discharge port into a gas inlet part 45 (which will be described later) of the airbag 40 for window and using a clamp 36 arranged on an outer periphery of the gas inlet part 45. Also, the inflator 35 for window is mounted at a position of the inner panel 2 above the window W2 by using the mounting bracket 37 for holding the inflator 35 for window and a bolt 38 for fixing the mounting bracket 37 to the inner panel 2 of the body 1 (refer to FIG. 1). The inflator 35 for window is electrically connected to the control device (not shown) via a lead wire (not shown), and is configured to be activated upon detection of the side collision, the oblique collision and the offset collision of the vehicle V by the control device. In the illustrative embodiment, when the oblique collision or offset collision of the vehicle V is detected by the control device, the inflator 35 for window is controlled to start the activation thereof within a range of −20 ms to −5 ms (preferably, a range of −17 ms to −10 ms) from a time at which the front airbag 25 starts to receive the driver MD (the inflator 35 for window is controlled to start the activation thereof at a timing of 5 ms or more but a timing less than 20 ms (preferably, at a timing of 10 ms or more but a timing less than 17 ms) before the front airbag 25 starts to receive the driver MD). If the activation of the inflator 35 for window starts at a time of 20 ms or more before the front airbag 25 starts to receive the driver MD, the activation start timing is too early. As a result, before the front airbag 25 starts to receive the driver MD, the airbag 40 for window has already completely inflated to cover the window W1, and the inflated airbag 40 for window moves toward the vehicle exterior-side (window W1-side) distant from the driver MD due to the inertia caused by the vehicle V rotating as a result of the oblique collision or offset collision, so that the head H of the driver MD moving obliquely forward with being received by the front airbag 25 may not be smoothly restrained by the airbag 40 for window. Also, if the activation of the inflator 35 for window starts at a timing less than 5 ms before the front airbag 35 starts to receive the driver MD even though the activation start timing is before the front airbag 25 starts to receive the driver MD, the activation start timing is too late. As a result, when the front airbag 25 has received the driver MD, the airbag 40 for window has not deployed to cover the vehicle interior-side of the window W1, so that the head H of the driver MD moving obliquely forward with being received by the front airbag 25 may not be smoothly restrained by the airbag 40 for window.

Each of the mounting brackets 32 is configured by two plates, is mounted to each of mounting parts 62, 71 (which will be described later) of the airbag 40 for window with sandwiching each of the mounting parts 62, 71 from the front and back sides, and mounts and fixes each of the mounting parts 62, 71 to the inner panel 2 of the body 1 by using a bolt 33 (refer to FIGS. 1 and 2).

Figure 4:
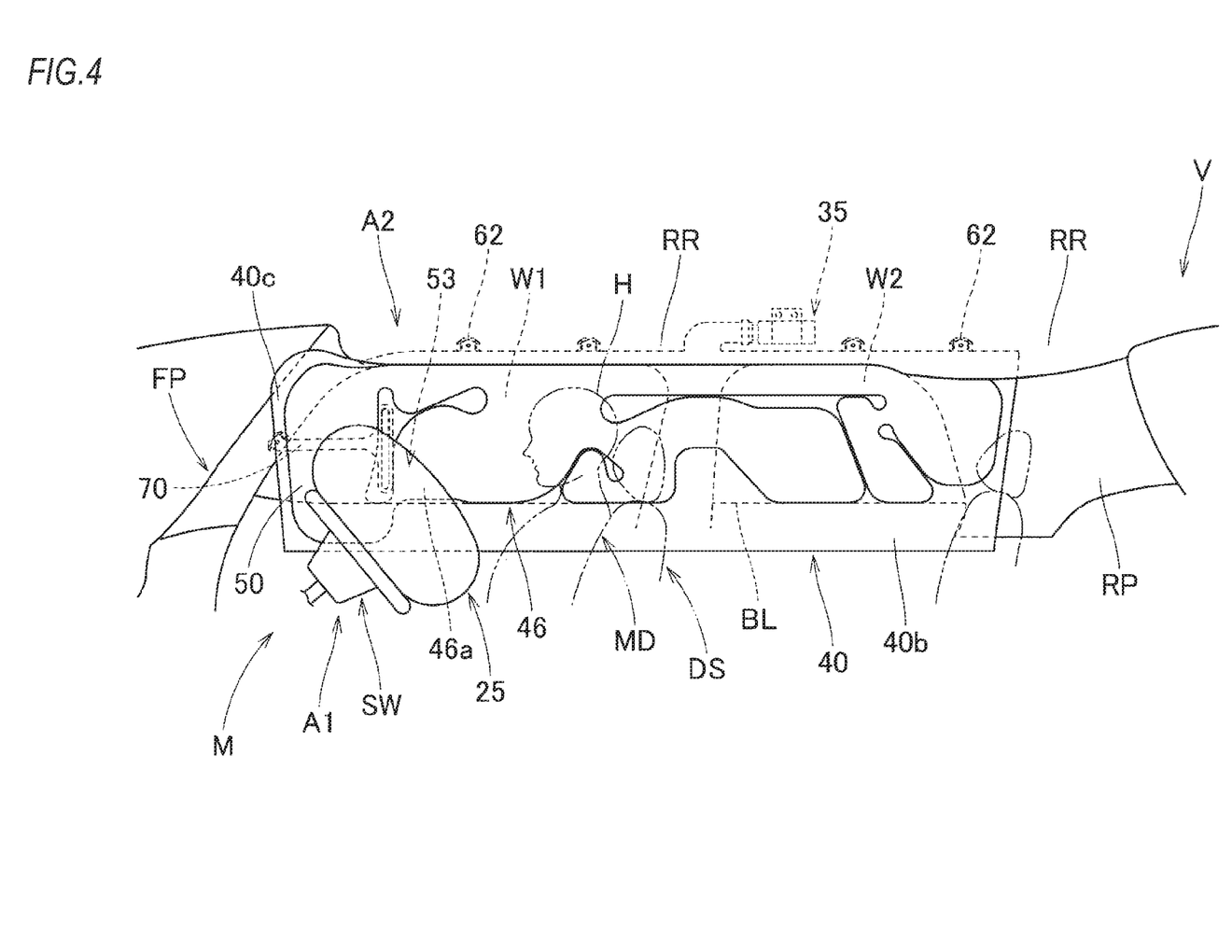
FIG. 4 is a schematic front view of a front airbag and an airbag for window in an inflated state in the passenger protection device of the illustrative embodiment.
Figure 5:
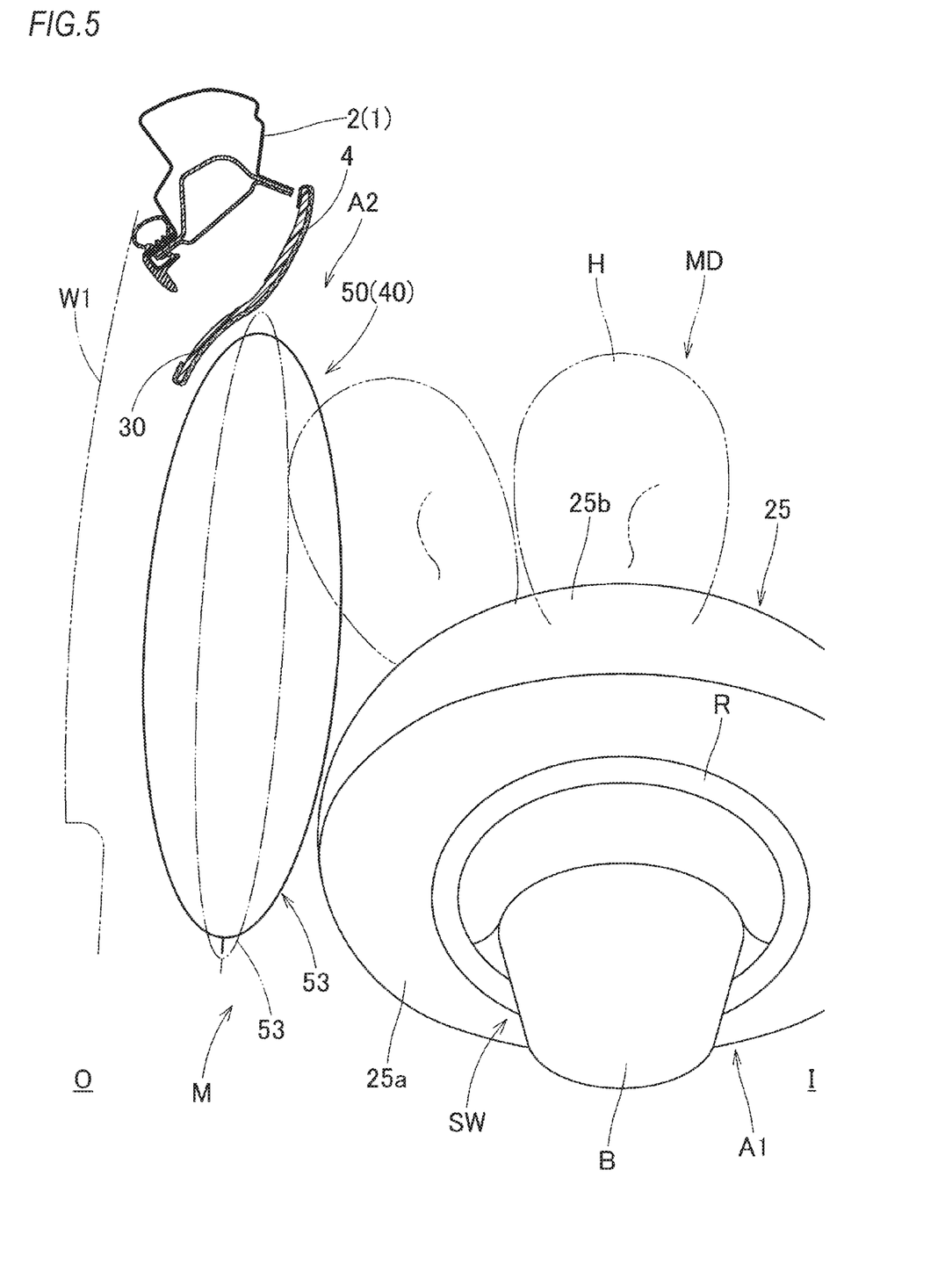
FIG. 5 is a schematic view of the front airbag and the airbag for window in the inflated state in the passenger protection device of the illustrative embodiment, as seen from the front of a vehicle.

As shown in FIG. 4, the airbag 40 for window is configured to deploy from the folded state and to deploy and inflate so as to cover the windows W1. W2 and the vehicle interior-side of pillar garnishes 6, 7 of the center pillar part CP and the rear pillar part RP by allowing the inflation gas to flow in the airbag from the inflator 35 for window. Specifically, an outer shape of the airbag 40 for window upon completion of the inflation is a substantially rectangular plate shape so as to cover the vehicle interior-side from the window W1 to a front side of the rear pillar part RP via the center pillar part CP and the window W2. In the illustrative embodiment, the airbag 40 for window is configured so that a lower edge 40b is to be located below a belt line BL formed by lower edges of the windows W1, W2 upon completion of the inflation (refer to FIG. 4). Also, the airbag 40 for window is configured so that a region of a front end 40c-side is to be arranged between the window W1 and the front airbag 25 having inflated to cover a rear surface of the steering wheel SW over an entire surface upon completion of the inflation. That is, the airbag 40 for window is configured to cover a side of the head H of the driver MD received by the front airbag 25 upon the deployment. The airbag 40 for window is accommodated in the upper edges of the windows W1, W2 in a state where the airbag is folded so as to approximate the lower edge 40b to an upper edge 40a from a state in which the airbag is flatly deployed so as to superimpose a vehicle interior-side wall part 41a and a vehicle exterior-side wall part 41b (which will be described later) each other.

Figure 3:
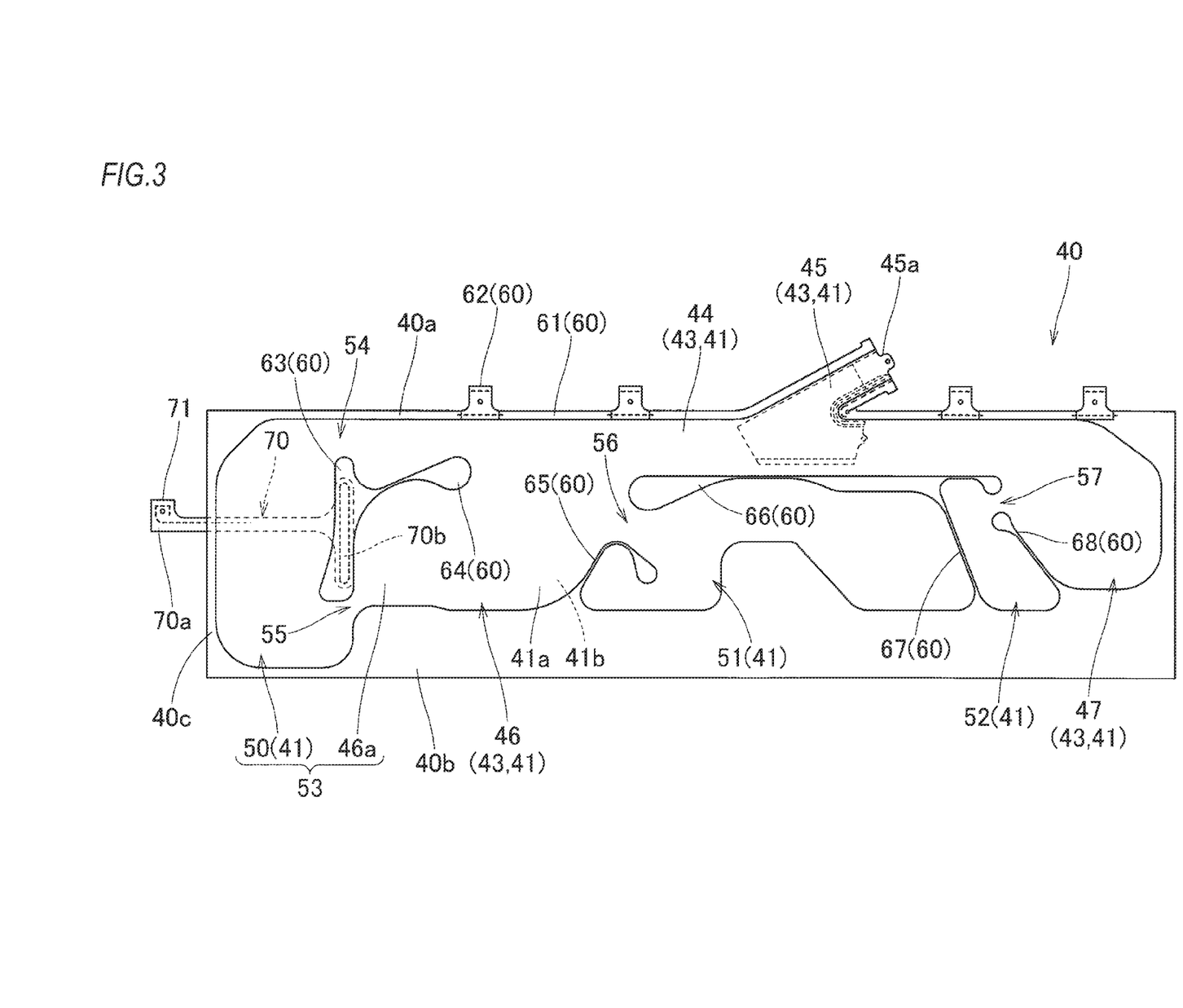
FIG. 3 is a front view of an airbag for window in a flatly deployed state, which is used for an airbag device for window configuring the passenger protection device of the illustrative embodiment.

In the illustrative embodiment, the airbag 40 for window is integrally manufactured by hollow weaving using polyamide yarn, polyester yarn or the like, except a coupling belt 70 (which will be described later), and an outer surface thereof is applied with a coating agent made of silicone resin for gas leakage prevention. As shown in FIG. 3, the airbag 40 for window includes a gas inflow part 41 configured to inflate by allowing the inflation gas to flow therein and a non-inflow part 60 configured not to allow the inflation gas to flow therein so as to space a vehicle interior-sidewall part 41a to be located at the vehicle interior-side and a vehicle exterior-side wall part 41b to be located at the vehicle exterior-side upon completion of the inflation.

In the illustrative embodiment, the gas inflow part 41 includes a main inflation part 43 (primary inflation part) configured to inflate by allowing the inflation gas, which is to be discharged from the inflator 35 for window, to flow therein, a front-side sub-inflation part 50, a center-side sub-inflation part 51 and a rear-side sub-inflation part 52 (which are a secondary inflation part) as a sub-inflation part configured to communicate with the main inflation part 43 and to inflate by allowing the inflation gas to flow therein via the main inflation part 43, and communication parts 54, 55, 56, 57 configured to enable the main inflation part 43 and the front-side sub-inflation part 50, center-side sub-inflation part 51 and rear-side sub-inflation part 52 to communicate with each other, respectively. In the illustrative embodiment, the airbag 40 for window is configured to inflate over a substantially entire surface by allowing the inflation gas to flow therein, except some regions of demarcation parts 63, 64, 65, 66, 67, 68 for demarcating the main inflation part 43, the front-side sub-inflation part 50, the center-side sub-inflation part 51 and the rear-side sub-inflation part 52.

The main inflation part 43 has a gas guide flow path 44, a gas inlet part 45, a front seat protection part 46 and a rear seat protection part 47.

The gas guide flow path 44 is arranged over a substantially entire region of the main inflation part 43 so as to extend substantially in the front and rear direction at the upper edge 40a-side of the airbag 40 for window. The gas guide flow path 44 is configured to guide the inflation gas to be discharged from the inflator 35 for window to the front seat protection part 46 and the rear seat protection part 47 arranged below the gas guide flow path 44, at an early stage of the inflation of the airbag 40 for window. The gas inlet part 45 is arranged to protrude upward in the vicinity of a center of the gas guide flow path 44 in the front and rear direction. In the illustrative embodiment, the gas inlet part 45 is inclined so that a rear side is raised relative to the gas guide flow path 44, and a rear end 45a is opened so that the inflator 35 for window can be inserted therein. The gas inlet part 45 is fitted on its outer periphery with the clamp 36 in a state where the inflator 35 for window is inserted therein, so that the gas inlet part is coupled to the inflator 35 for window.

The front seat protection part 46 is to protect the head H of the passenger MD sitting on the driver seat DS upon the side collision or roll-over of the vehicle V, and is a part that is to be arranged to cover the vehicle interior-side in a substantial rear half region (a region at the rear of a region in which the front pillar part FP is arranged) of the window W1 at a side of the head H of the passenger MD sitting on the driver seat DS upon completion of the inflation of the airbag 40 for window. The rear seat protection part 47 is to protect a head of a passenger sitting on the rear seat arranged at the rear of the driver seat DS and is a part that is to be arranged at a lateral side of the rear seat so as to cover the vehicle interior-side of the window W2 upon completion of the inflation.

The front-side sub-inflation part 50 is arranged at the front end 40c-side of the airbag 40 for window so as to be adjacent to a front side of the main inflation part 43 (the front seat protection part 46), and is a part that is to be arranged to cover the vehicle interior-side in a substantial front half region (a region below the front pillar part FP) of the window W1 upon completion of the inflation. The front-side sub-inflation part 50 is configured to communicate with the front seat protection part 46 by the communication part 54 opening toward a rear upper end and the communication part 55 opening toward a rear lower end. The communication parts 54, 55 have opening width dimensions set to be small so that the inflow start of the inflation gas into the front-side sub-inflation part 50 is to be later than the front seat protection part 46.

Figure 8:
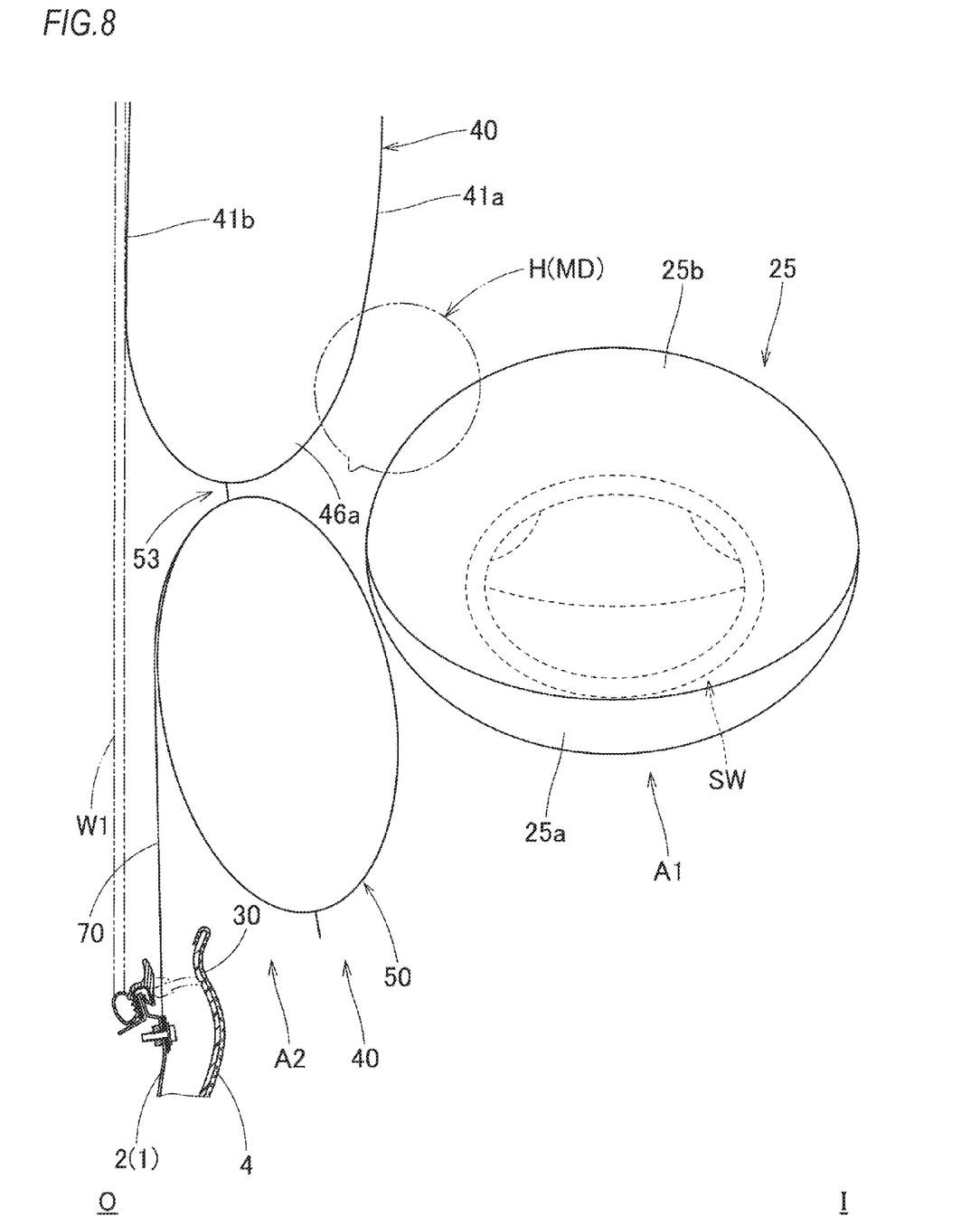
FIG. 8 is a schematic cross sectional view depicting a state where the head of the passenger is received by the airbag for window and the front airbag of which inflations have been completed after the state of FIG. 7, in the passenger protection device of the illustrative embodiment.

In the passenger protection device M of the illustrative embodiment, the front-side sub-inflation part 50 and the front end-side region 46a of the front seat protection part 46 are parts that are to be arranged between the window W1 and the front airbag 25 having inflated to cover the rear surface of the steering wheel SW over an entire surface at a front end-side of the window W1 becoming an arrangement region of the front pillar part FP, upon completion of the inflation of the airbag 40 for window (refer to FIGS. 4 and 8). The front-side sub-inflation part 50 and the front end-side region 46a of the front seat protection part 46 are parts that are to receive the head H of the driver MD moving obliquely forward and toward a vehicle exterior-side upon the oblique collision or offset collision of the vehicle V. That is, in the illustrative embodiment, a bag-adjacent inflation part 53, which is configured to cover a side of the head H of the driver MD received on the front airbag 25, of the airbag 40 for window is configured by the front-side sub-inflation part 50 and the front end-side region 46a of the front seat protection part 46.

The center-side sub-inflation part 51 is arranged in a region at the rear of the front seat protection part 46 of the main inflation part 43 and below the gas guide flow path 44, and is configured to communicate with the front seat protection part 46 by the communication part 56 opening toward a rear end-side of the front seat protection part 46. The communication part 56 has also an opening width dimension set to be small so that the inflow start of the inflation gas into the center-side sub-inflation part 51 is to be later than the front seat protection part 46. The rear-side sub-inflation part 52 is arranged to fill a lower region of the gas guide flow path 44 between the center-side sub-inflation part 51 and the rear seat protection part 47, and is configured to communicate with the rear seat protection part 47 by the communication part 57 opening toward a front end-side of the rear seat protection part 47. The communication part 57 has also an opening width dimension set to be small so that the inflow start of the inflation gas into the rear-side sub-inflation part 52 is to be later than the rear seat protection part 47.

The non-inflow part 60 includes a peripheral edge part 61 configuring an outer peripheral edge of the gas inflow part 41, mounting parts 62, and demarcation parts 63, 64, 65, 66, 67, 68 arranged in a region of the gas inflow part 41.

The peripheral edge part 61 is arranged to surround a periphery of the gas inflow part 41 over an entire circumference, except the rear end 45a-side of the gas inlet part 45. The mounting parts 62 are parts for mounting the upper edge 40a-side of the airbag 40 for window to the inner panel 2 of the body 1, and are arranged at a plurality of (four, in the illustrative embodiment) places in the front and rear direction with protruding upward from the upper edge-side of the peripheral edge part 61 becoming the upper edge 40a-side of the airbag 40 for window. Each mounting part 62 is formed with a mounting hole (a reference numeral thereof is omitted) in which the mounting bolt 33 can be inserted. The demarcation parts 63, 64, 65, 66, 67, 68 are arranged to divide a region of the gas inflow part 41 into the gas guide flow path 44, the front seat protection part 46, the rear seat protection part 47, the front-side sub-inflation part 50, the center-side sub-inflation part 51 and the rear-side sub-inflation part 52. In the airbag 40 for window of the illustrative embodiment, a gap between an upper end of the demarcation part 63 and the peripheral edge part 61 configures the communication part 54, a gap between a lower end of the demarcation part 63 and the peripheral edge part 61 configures the communication part 55, a gap between the demarcation parts 65, 66 configures the communication part 56, and a gap between the demarcation parts 66, 68 configures the communication part 57.

Also, in the airbag 40 for window of the illustrative embodiment, as shown in FIG. 3, a coupling belt 70 made of a fabric material, which is a separate member from the airbag 40 for window, is arranged. The coupling belt 70 is to couple the front end 40c of the airbag 40 for window to the body 1, and is configured to couple a rear end 70b thereof to the demarcation part 63 and to extend forward substantially in the front and rear direction at the vehicle exterior-side wall part 41b-side of the airbag 40 for window. A front end 70a of the coupling belt 70 is formed with a mounting part 71 that is to be fixed to the inner panel 2 of the body 1 at the front pillar part FP. Like the mounting part 62, the mounting part 71 is configured to be fixed to the inner panel 2 by using the mounting bracket 32 and the mounting bolt 33, and is formed with a mounting hole (a reference numeral thereof is omitted) in which the mounting bolt 33 can be inserted.

The airbag 40 for window of the illustrative embodiment has a volume of about 50 L. In the illustrative embodiment, the inflation of the main inflation part 43 is to be substantially completed after about 20 ms elapses from the activation start of the inflator 35 for window and the entire inflation including the front-side sub-inflation part 50, the center-side sub-inflation part 51 and the rear-side sub-inflation part 52 is to be substantially completed after about 50 ms elapses.

In the passenger protection device M of the illustrative embodiment, when the oblique collision or offset collision occurs from the oblique right front of the vehicle V, the front inflator 16 and the inflator 35 for window of the front airbag device A1 and the airbag device A2 for window are activated on the basis of an activation signal from the control device (not shown). Then, the front airbag 25 inflates by allowing the inflation gas to flow therein, pushes and opens the door parts 19b, 19b of the airbag cover 19, and protrudes from the case 17, thereby completely inflating so as to cover the rear surface (upper surface) of the steering wheel SW over the substantially entire surface, as shown in FIGS. 4 to 8. The airbag 40 for window inflates by allowing the inflation gas to flow therein, pushes and opens the airbag cover 30 configured by the lower edges of the front pillar garnish 4 and the roof head lining 5, and protrudes downward, thereby completely inflating so as to cover the window W1, W2, the center pillar part CP and the vehicle interior-side of a part of the rear pillar part RP at the vehicle exterior-side (right side) of the driver seat DS (refer to FIGS. 4, 5 and 8).

Figure 6A:
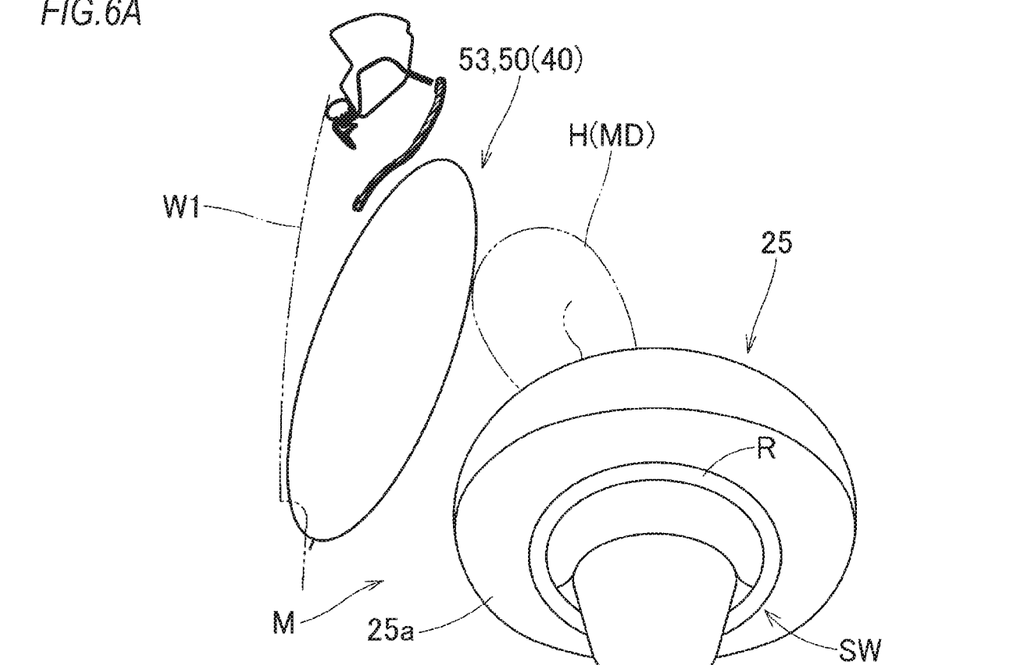
FIGS. 6A and 6B are schematic views as seen from the front of the vehicle, exemplifying a case where an activation start of the inflator for window in the passenger protection device is too early and a case where the activation start is too late.
Figure 6B:
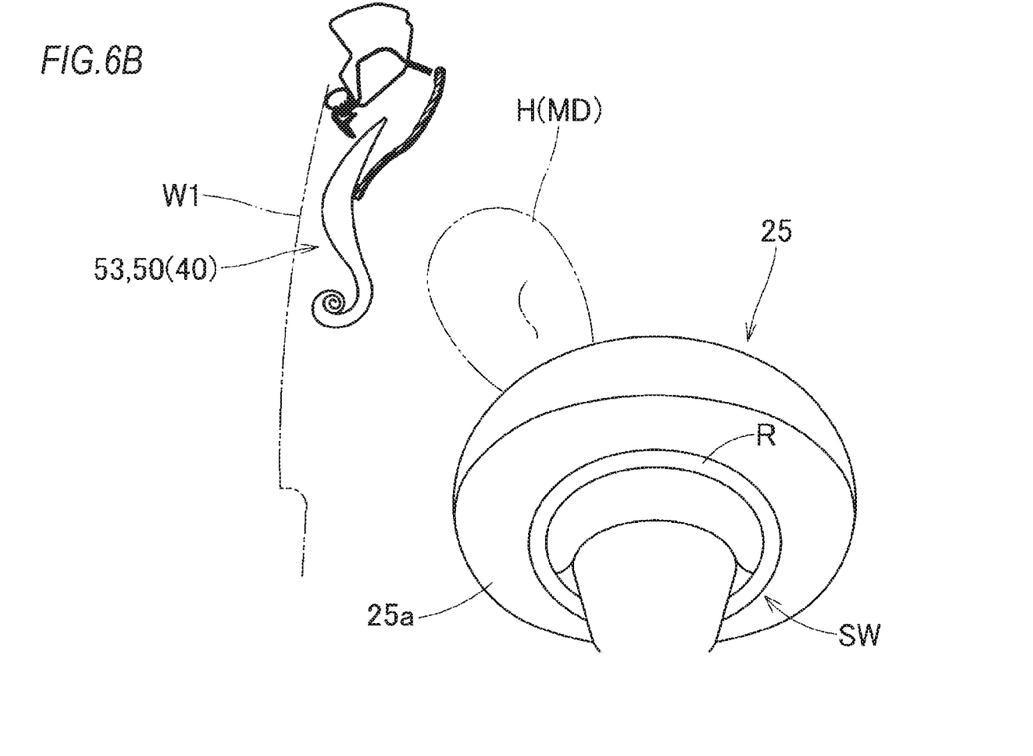
Figure 7:
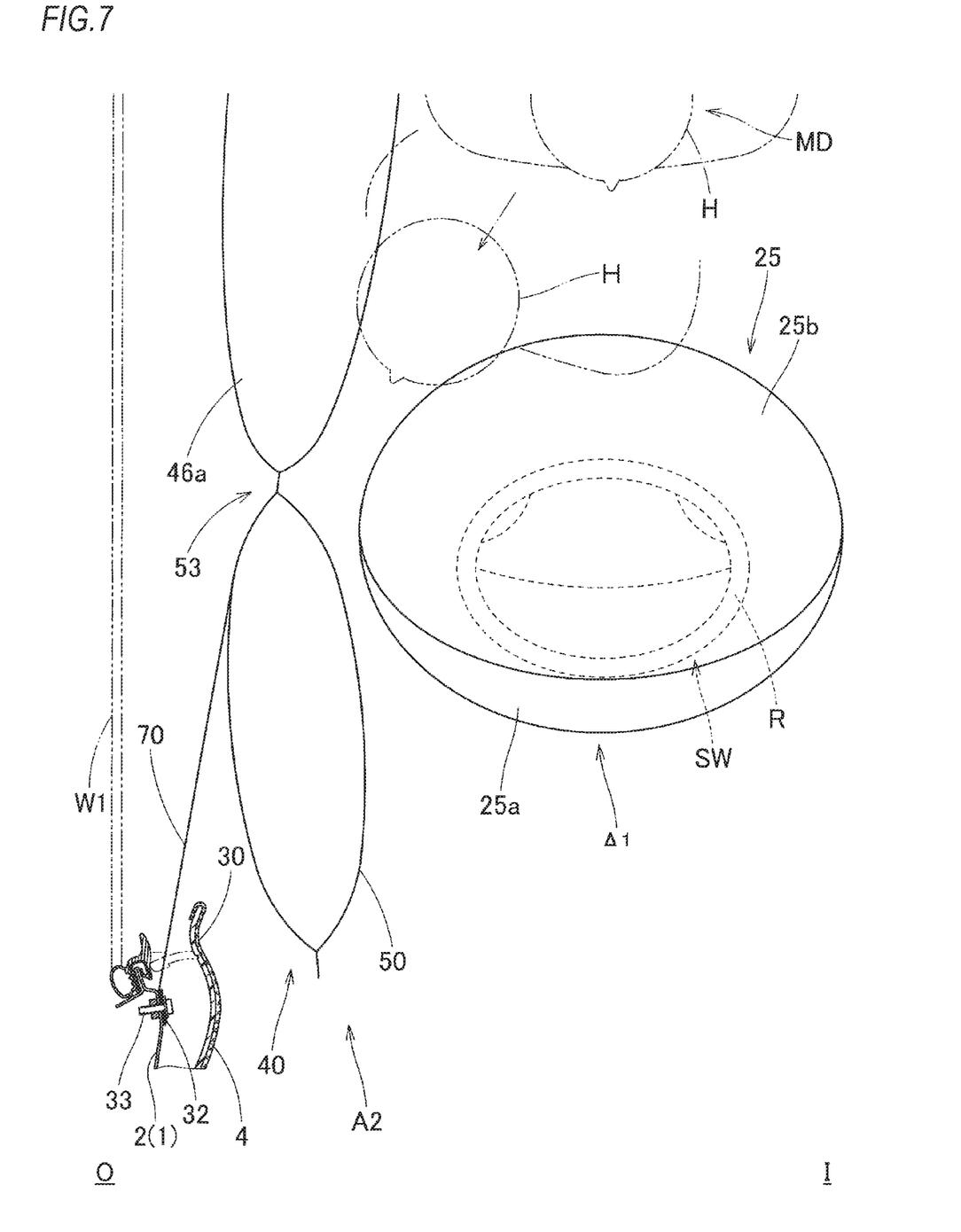
FIG. 7 is a schematic cross sectional view depicting a state where a head of a passenger moving obliquely forward is received before inflation completion of the airbag for window after inflation of the front airbag in the passenger protection device of the illustrative embodiment.

In the passenger protection device M of the illustrative embodiment, the inflator 35 for window configured to supply the inflation gas to the airbag 40 for window has an activation start timing set to be later than an activation start of the front inflator 16 configured to supply the inflation gas to the front airbag 25, and is configured to start activation within a range of −2 ms to −5 ms from a time at which the front airbag 25 starts to receive the driver MD as a passenger, thereby inflating the airbag 40 for window. If the activation of the inflator 35 for window starts at a timing of 20 ms or more before the front airbag 35 starts to receive the driver MD, the activation start timing is too early. As a result, when the front airbag 25 starts to receive the driver MD, the airbag 40 for window has already completely inflated to cover the window W1, and the inflated airbag 40 for window (the bag-adjacent inflation part 53) moves to separate from the driver MD toward the vehicle exterior-side (the window W1-side) due to the inertia caused by the vehicle V rotating as a result of the oblique collision or offset collision (refer to FIG. 6A), so that the head H of the driver MD moving obliquely forward with being received by the front airbag 25 may not be smoothly restrained by the airbag 40 for window. Also, if the activation of the inflator 35 for window starts at a timing less than 5 ms before the front airbag 35 starts to receive the driver MD even though the activation start timing is before the front airbag 25 starts to receive the driver MD, the activation start timing is too late. As a result, when the front airbag 25 has received the driver MD, the airbag 40 for window has not deployed to cover the vehicle interior-side of the window W1, as shown in FIG. 6B, so that the head H of the driver MD moving obliquely forward with being received by the front airbag 25 may not be smoothly restrained by the airbag 40 for window.

In the passenger protection device M of the illustrative embodiment, the inflator 35 for window configured to supply the inflation gas to the airbag 40 for window has the activation start timing set within the range of −20 ms to −5 ms from the time at which the front airbag 25 starts to receive the driver MD. Therefore, when the front airbag 25 has received the driver MD moving obliquely forward, the bag-adjacent inflation part 53 of the airbag 40 for window has been deployed and inflated to cover the vehicle interior-side I of the window W1 but has not completely inflated yet, as shown with the dashed-two dotted line in FIG. 5 and FIG. 7. That is, the bag-adjacent inflation part 53 is deployed to enter a gap between the window W1 and the head H of the driver MD, covers a side (vehicle exterior-side O) of the head H of the driver MD received by the front airbag 25 and is arranged in an inflation state where it has a thickness to some extent. For this reason, in the passenger protection device M of the illustrative embodiment, when the head H of the driver MD moving obliquely forward has been received by the front airbag 25, the head is contacted to the bag-adjacent inflation part 53 of the airbag 40 for window deployed to cover the vehicle interior-side of the window W1, as shown in FIGS. 6A and 6B, so that the head H of the driver MD is restricted from rotating in the left and right direction by a frictional resistance caused due to the contact with the bag-adjacent inflation part 53 in the deployed state (a state before inflation completion). Accordingly, it is possible to correctly restrain the head H of the driver MD by the front airbag 25 while suppressing the rotation thereof. Thereafter, the airbag 40 for window (the bag-adjacent inflation part 53) is further inflated by the inflation gas introduced therein, as shown in FIG. 8. Therefore, it is possible to restrain the head H of the driver MD moving obliquely forward from both the left and right sides by both the bag-adjacent inflation part 53 of the inflated airbag 40 for window and the front airbag 25, so that it is possible to correctly restrain the head H of the driver MD by further restricting the head from moving obliquely forward.

Accordingly, in the passenger protection device M of the illustrative embodiment, it is possible to correctly protect the driver MD as a passenger moving obliquely forward by both the front airbag 25 configured to inflate in front of the driver MD and the airbag 40 for window configured to inflate so as to cover the vehicle interior-side of the window W1 at a lateral side of the driver MD.

In the passenger protection device M of the illustrative embodiment, the activation start timing of the inflator 35 for window is set on the basis of the time at which the front airbag 25 having completely inflated starts to receive the passenger (driver MD). Therefore, even when an interior shape of the vehicle and a volume of the front airbag are different, depending on vehicles to which the passenger protection device is to be mounted, it is possible to appropriately inflate the airbag for window, so that it is possible to correctly restrain the passenger moving obliquely forward by the inflated front airbag and airbag for window.

Also, in the passenger protection device M of the illustrative embodiment, the bag-adjacent inflation part 53, which is configured to cover a side of the head H of the driver MD received by the front airbag 25, of the airbag 40 for window is configured by the front end-side region 46a of the front seat protection part 46, which is the main inflation part 43, and the front-side sub-inflation part 50 configured so that the inflow start of the inflation gas therein is to be later than the main inflation part 43, and the demarcation part 64 arranged to extend from the demarcation part 63 substantially in the front and rear direction is arranged at the upper side of the front end-side region 46a. Therefore, it is possible to deploy the bag-adjacent inflation part 53 in a thin state where an inflow amount of the inflation gas into the bag-adjacent inflation part is reduced, in association with the inflation of the main inflation part 43 (front seat protection part 46) being deployed and inflated downward while the inflation gas is allowed to flow into the main inflation part. Also, even when a gap between the front airbag 25 covering the steering wheel SW and the window W1 is narrow, it is possible to allow the front end 40c (front-side sub-inflation part 50) of the airbag 40 for window to smoothly enter the narrow gap.

Also, in the passenger protection device M of the illustrative embodiment, an airbag for steering wheel accommodated with being folded in the steering wheel SW arranged in front of the driver seat DS is used as the front airbag 25. However, the front airbag is not limited to the illustrative embodiment. For example, an airbag of an airbag device for front passenger seat arranged in front of a front passenger seat may be used as the front airbag so as to protect a front passenger seat passenger sitting on the front passenger seat. In this case, the activation start timing of the inflator for window configured to supply the inflation gas to the airbag for window arranged to cover the vehicle interior-side of the window arranged at a lateral side of the front passenger seat is set within a range of −20 ms to −5 ms from the time at which an airbag for front passenger seat having completely inflated starts to receive the front passenger seat passenger. Thereby, it is possible to protect the front passenger seat passenger moving obliquely forward and toward a vehicle exterior-side by both the airbag for front passenger seat and the airbag for window.

According to an aspect of the invention, there is provided a passenger protection device capable of protecting a passenger sitting on a front seat and moving obliquely forward and toward a vehicle exterior-side upon an oblique collision or offset collision of a vehicle, the passenger protection device comprising: a front airbag accommodated with being folded in front of the front seat and configured to inflate so as to cover a front of an upper half body of the passenger sitting on the front seat by allowing an inflation gas to flow therein upon activation; a front inflator configured to supply the inflation gas to the front airbag upon activation; an airbag for window accommodated with being folded at an upper edge-side of a window arranged at a lateral side of the passenger and configured to inflate so as to cover a vehicle interior-side of the window by allowing an inflation gas to flow therein upon activation: and an inflator for window configured to supply the inflation gas to the airbag for window upon activation, wherein the airbag for window includes a bag-adjacent inflation part configured to cover a side of a head of the passenger received by the front airbag upon deployment, and an activation start timing of the inflator for window is set within a range of −20 ms to −5 ms from a time at which the front airbag having completely inflated starts to receive the passenger.

In the passenger protection device of the present invention, the inflator for window configured to supply the inflation gas to the airbag for window has the activation start timing set to be later than the activation start of the front inflator configured to supply the inflation gas to the front airbag, and is configured to start activation within the range of −20 ms to −5 ms from the time at which the front airbag starts to receive the passenger, thereby inflating the airbag for window. If the activation of the inflator for window starts at a timing of 20 ms or more before the front airbag starts to receive the passenger, the activation start timing is too early. As a result, when the front airbag starts to receive the passenger, the airbag for window has already completely inflated to cover the window, and the bag-adjacent inflation part, which is configured to cover a side of the head of the passenger received by the front airbag, of the inflated airbag for window moves to separate from the passenger toward a vehicle exterior-side (window-side) due to the inertia caused by the vehicle rotating as a result of an oblique collision or offset collision, so that the head of the passenger moving obliquely forward with being received by the front airbag may not be smoothly restrained by the bag-adjacent inflation part. Also, if the activation of the inflator for window starts at a timing less than 5 ms before the front airbag starts to receive the driver even though the activation start timing is before the front airbag starts to receive the driver, the activation start timing is too late. As a result, when the front airbag has received the passenger, the airbag for window has not deployed to cover the vehicle interior-side of the window, so that the head of the passenger moving obliquely forward with being received by the front airbag may not be smoothly restrained by the bag-adjacent inflation part.

In the passenger protection device of the present invention, the inflator for window configured to supply the inflation gas to the airbag for window has the activation start timing set within the range of −20 ms to −5 ms from the time at which the front airbag starts to receive the passenger. Therefore, when the front airbag has received the passenger moving obliquely forward, the bag-adjacent inflation part of the airbag for window has deployed and inflated to cover the vehicle interior-side of the window but has not completely inflated yet. That is, upon the receiving of the passenger by the front airbag, the bag-adjacent inflation part is deployed to enter a gap between the window and the head of the passenger, covers a side of the head of the passenger received by the front airbag and is arranged in an inflation state where it has a thickness to some extent. For this reason, in the passenger protection device of the present invention, when the head of the passenger moving obliquely forward has been received by the front airbag, the head is contacted to the bag-adjacent inflation part deployed to cover the vehicle interior-side of the window, so that the head of the passenger is restricted from rotating in a left and right direction by a frictional resistance caused due to the contact with the bag-adjacent inflation part in the deployed state (a state before inflation completion). Accordingly, it is possible to correctly restrain the head of the passenger by the front airbag while suppressing the rotation thereof. Thereafter, the airbag for window (bag-adjacent inflation part) is further inflated by the inflation gas introduced therein. Therefore, it is possible to restrain the head of the passenger moving obliquely forward from both the left and right sides by both the bag-adjacent inflation part of the inflated airbag for window and the front airbag, so that it is possible to correctly restrain the head of the passenger by further restricting the head of the passenger from moving obliquely forward.

Accordingly, in the passenger protection device of the present invention, it is possible to correctly protect the passenger moving obliquely forward by both the front airbag configured to inflate in front of the passenger and the airbag for window configured to inflate so as to cover the vehicle interior-side of the window at a lateral side of the passenger.

More specifically, the activation start timing of the inflator for window is preferably set within a range of −17 ms to −10 ms from the time at which the front airbag starts to receive the passenger. Also, as the front airbag, an airbag for steering wheel accommodated with being folded in a steering wheel arranged in front of a driver seat may be exemplified.

What is claimed is:

1. A passenger protection device capable of protecting a passenger sitting on a front seat and moving obliquely forward and toward a vehicle exterior-side upon an oblique collision or offset collision of a vehicle, the passenger protection device comprising:
- a front airbag accommodated with being folded in front of the front seat and configured to inflate so as to cover a front of an upper half body of the passenger sitting on the front seat by allowing an inflation gas to flow therein upon activation;
- a front inflator configured to supply the inflation gas to the front airbag upon activation;
- a window airbag for a window of the vehicle, the window airbag being accommodated with being folded at an upper edge-side of the window arranged at a lateral side of the passenger and configured to inflate so as to cover a vehicle interior-side of the window by allowing an inflation gas to flow therein upon activation; and
- a window airbag inflator configured to supply the inflation gas to the window airbag upon activation, wherein the window airbag includes a bag-adjacent inflation part configured to cover a side of a head of the passenger received by the front airbag upon deployment and configured to restrain the head of the passenger moving obliquely forward in a lateral direction, and an activation start timing of the window airbag inflator is set within a range of −20 ms to −5 ms from a time at which the front airbag having completely inflated starts to receive the passenger.

2. The passenger protection device according to claim 1, wherein the activation start timing of the window airbag inflator is set within a range of −17 ms to −10 ms from the time at which the front airbag starts to receive the passenger.

3. The passenger protection device according to claim 1, wherein the front airbag is an airbag for steering wheel accommodated with being folded in a steering wheel arranged in front of a driver seat, and in a top view, an end in a vehicle width direction of the front airbag having completely inflated on the side of the window airbag is ahead of a demarcation part in the lateral direction of the window airbag in a deployed state.

* * * * *